(12) United States Patent  (10) Patent No.: US 7,444,800 B2
Hermey  (45) Date of Patent: Nov. 4, 2008

(54) ENERGY GUIDING CHAIN

(75) Inventor: Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 11/738,182

(22) Filed: Apr. 20, 2007

(65) Prior Publication Data

US 2007/0245705 A1  Oct. 25, 2007

(30) Foreign Application Priority Data

Apr. 21, 2006 (DE) .................. 20 2006 006 638 U

(51) Int. Cl.
F16G 13/16 (2006.01)
(52) U.S. Cl. .............................. 59/78.1; 248/49; 248/51
(58) Field of Classification Search .................. 59/78.1; 248/49, 51
See application file for complete search history.

(56) References Cited

U.S. PATENT DOCUMENTS

| 3,284,036 | A | | 11/1966 | Nansel | |
|---|---|---|---|---|---|
| 3,716,986 | A | * | 2/1973 | Cork et al. | 59/78.1 |
| 3,779,003 | A | * | 12/1973 | Boissevain et al. | 59/78.1 |
| 4,373,324 | A | * | 2/1983 | Janos | 59/78.1 |
| 4,392,344 | A | * | 7/1983 | Gordon et al. | 248/49 |
| 6,371,876 | B1 | | 4/2002 | Blase | |
| 6,425,238 | B1 | | 7/2002 | Blase | |
| 6,612,104 | B2 | * | 9/2003 | Blase | 59/78.1 |
| 6,997,412 | B2 | * | 2/2006 | Komiya | 248/49 |
| 2002/0056336 | A1 | | 5/2002 | Blase | |
| 2002/0124548 | A1 | | 9/2002 | Blase | |

FOREIGN PATENT DOCUMENTS

| DE | 2656638 | 6/1978 |
|---|---|---|
| DE | 4313075 | 11/1994 |
| DE | 19715531 | 10/1998 |
| DE | 19919076 | 11/2000 |

(Continued)

OTHER PUBLICATIONS

German Search Report dated Aug. 10, 2007, received in corresponding priority German Application No. 20 2006 006 638.1, 4 pgs.

(Continued)

Primary Examiner—David B. Jones
(74) Attorney, Agent, or Firm—Grossman Tucker Perreault & Pfleger PLLC

(57) ABSTRACT

On an energy guiding chain for guiding hoses, cables and the like, with a number of chain links connected to each other in articulated fashion, which are formed by mutually parallel side straps (9) and cross-members connecting them, where the energy guiding chain can be traversed, forming a loop consisting of a lower strand, an upper strand, and a deflection zone connecting them, and pairs of adjacent side straps (9) can be pivoted relative to each other about a common pivoting axis (S), it is envisaged, in order to form the most continuous possible surface on the narrow face (10, 12) of the strap strands facing the respectively opposite strand, that the distance between the pivoting axis (S) and the narrow face (10) facing towards the inside of the loop is smaller than that between the pivoting axis (S) and the narrow face (12) facing towards the outside of the loop.

3 Claims, 4 Drawing Sheets

FOREIGN PATENT DOCUMENTS

| | | |
|---|---|---|
| DE | 10343263 | 5/2005 |
| DE | 20 2006 006 638 | 6/2006 |
| DE | 20 2006 006 645 | 7/2006 |
| FR | 2 723 627 | 2/1996 |
| FR | 2 875 065 | 3/2006 |
| GB | 1444307 | 7/1976 |
| JP | 60125441 | 7/1985 |
| WO | 99/57457 | 11/1999 |
| WO | 2005/108820 | 11/2005 |

OTHER PUBLICATIONS

International Search Report and Written Opinion dated Jul. 27, 2007, received in corresponding International Application No. PCT/DE2007/000674, 12 pgs.

German Search Report dated Aug. 14, 2007 received in related German Application No. 20 2006 006 645.4, 4 pgs.

PCT Search Report dated Sep. 6, 2007 received in related International Application No. PCT/DE07/00677, 4 pgs.

* cited by examiner

ENERGY GUIDING CHAIN

The invention relates to an energy guiding chain according to the generic part of the main Claim.

Energy guiding chains of this kind are known, for example, from DE 197 15 531 A1, WO 99/57457 A1 or DE 199 19 076 A1. They display two opposite strands of side straps, connected to each other in articulated, pivoting fashion, between which cross-members are fastened, bordering the interior of the chain links together with the side straps. Respectively adjacent side straps overlap each other in the area of the common pivoting axis. The side flaps can, for example, be designed as flat inner and outer straps, where the overlapping areas of the inner strap face towards the interior of the chain link, those of the outer strap facing away from it. A side strap can also display one inward-facing and one outward-facing overlapping area, these being connected by a right-angle bend. On the known energy guiding chains, the pivoting axis is located centrally between the narrow faces of the straps.

When traversing in operation, energy guiding chains often form a loop, consisting of a lower strand, an upper strand located above it, and a transitional area connecting the two. In this context, the energy guiding chain is almost exclusively stretched, or curved in such a way that it is concave on the inside of the loop. Therefore, the articulated joint between adjacent side straps must primarily permit pivoting from the stretched configuration in one direction, i.e. corresponding to a concave curvature.

It is known practice from WO 99/57457 A1 to provide at least some of the side straps with rollers that facilitate sliding of the upper strand on the lower strand and thus reduce friction when traversing the energy guiding chain. The narrow faces of the side straps facing towards the inside of the loop serve as running surfaces for the rollers in this context. It may be necessary for these running surfaces to also have the width of the complete strap strand in the overlapping area, so that the rollers can roll on the running surfaces continuously. In this context, they obstruct pivoting of the side straps relative to each other and have to be shortened, as a result of which gaps occur, particularly when the strap strand is stretched, said gaps leading to uneven running and noise generation.

The object of the invention is thus to indicate an energy guiding chain of the kind described, in which the narrow face of the strap strands facing the respectively opposite strand can be designed as a surface that is as continuous as possible.

This object is solved by an energy guiding chain according to the main Claim.

It has been found that even a continuous running surface does not obstruct pivoting if the pivoting axis is not located centrally between the running surface and the opposite narrow face of a side strap, but offset eccentrically towards the running surface. The extent of this offset is governed by the maximum pivoting angle to be achieved, which is generally limited by stops on the side straps anyway. In this context, "continuous" means that the gap in the running surface at the transition from one side strap to the next is restricted to the unavoidable play.

Particularly advantageous is an embodiment according to the invention in which at least some of the side straps are provided with rollers that can roll on the narrow face of the strap strand in the opposite strand. The continuous running surface permits rolling that is largely free of energy losses and generates little noise. In contrast, the gaps necessary in the event of central positioning of the pivoting axis would permit only bumpy and noisy rolling.

The scope of application of the invention is, however, not limited to the design with rollers. It is readily apparent that, even without rollers, a continuous narrow face on the inside of the loop is advantageous for the sliding of the upper strand on the lower strand, especially if, for example, damping or sliding elements are provided there in the known manner.

In a particularly preferred embodiment, rollers are present whose axes of rotation coincide with a pivoting axis of a pair of side straps. This permits a particularly short and simple design of the side straps.

The invention will now be described in more detail on the basis of the appended drawings.

Figure 1:
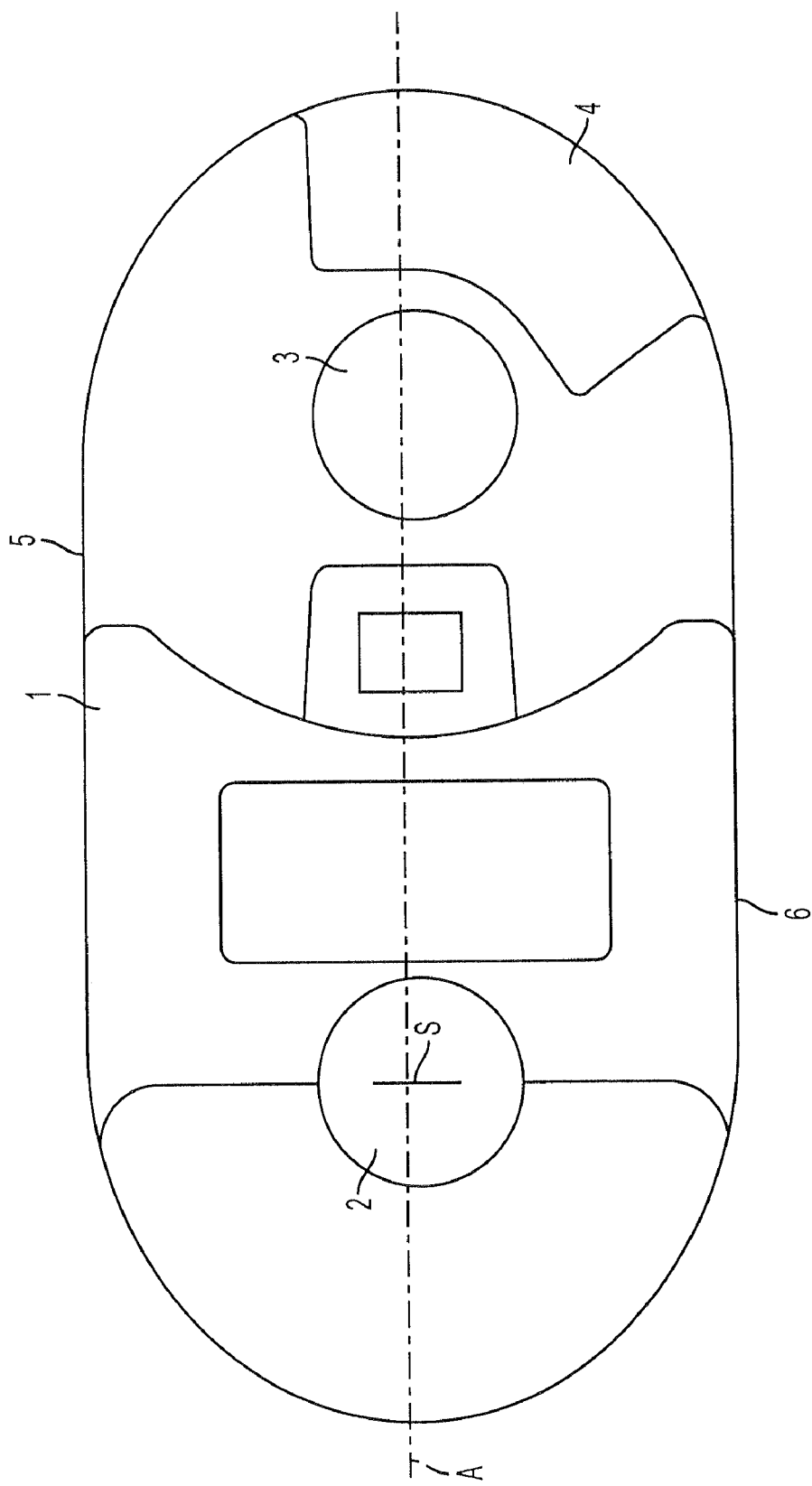
FIG. 1 is a schematic representation of a side strap according to the prior art.

In FIG. 1, side strap 1 displays a pivot pin 3 and a pin receptacle 2. When joining to a further side strap, pin 3 is inserted into receptacle 2, and the side straps can be pivoted about the pivoting axis S, which runs perpendicularly to the drawing plane. The pivoting angle is limited by stop 4. The strap is symmetrical as regards axis A, i.e. pivoting axis S lies centrally between narrow faces 5 and 6 of the strap.

Figure 2A:
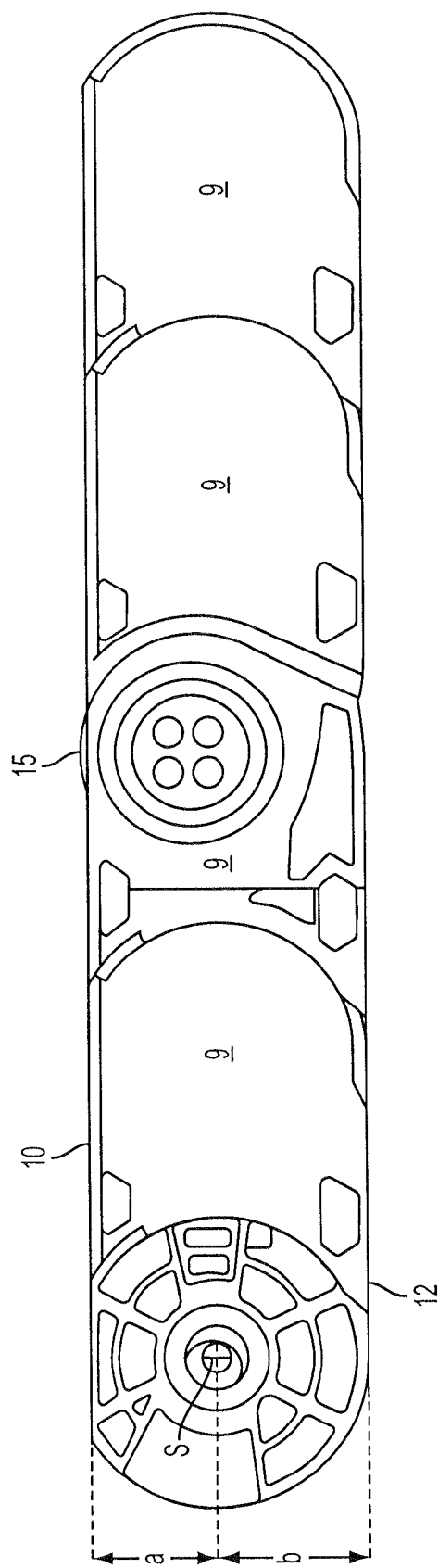
FIG. 2 shows a side view and a top view of a section of a strap strand of an energy guiding chain according to the invention, with four straps.
Figure 2B:
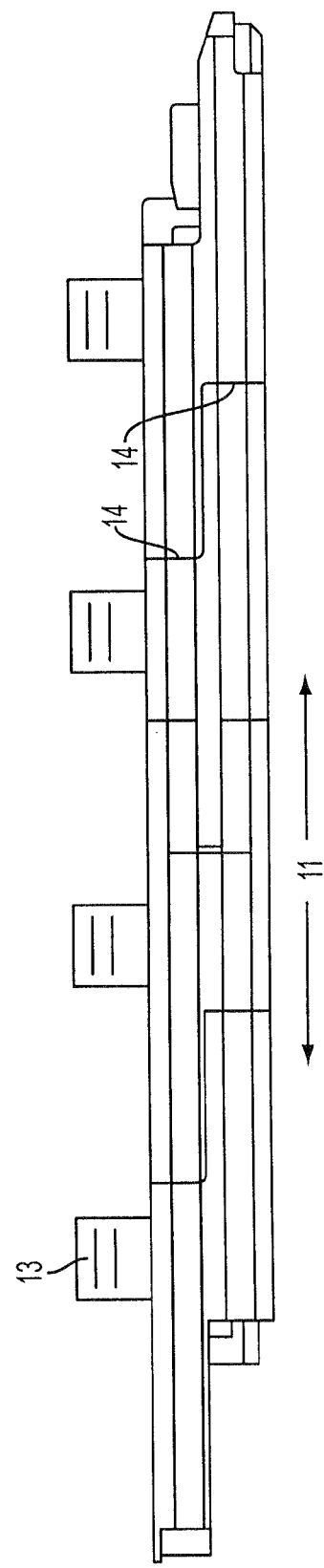

FIG. 2 shows a side view a) and a top view b) of a section of a strap strand of the bottom strand of an energy guiding chain according to the invention, with four side straps and in the stretched configuration. In this configuration, upper narrow face 10 of side straps 9 forms continuous running surface 11, with a width that is preferably constant over the length. Gaps 14 between the straps can be as narrow as the function allows, e.g. ≦1-5 mm. Pivoting axis S is defined by the pivot pin located there. Its distance a to narrow face 10 is smaller than distance b to the other narrow face 12. Pins 13 serve for connection to the cross-members. Installed in one of the side straps are rollers 15, which project slightly from the running surface and can roll on the opposite strand.

Figure 3A:
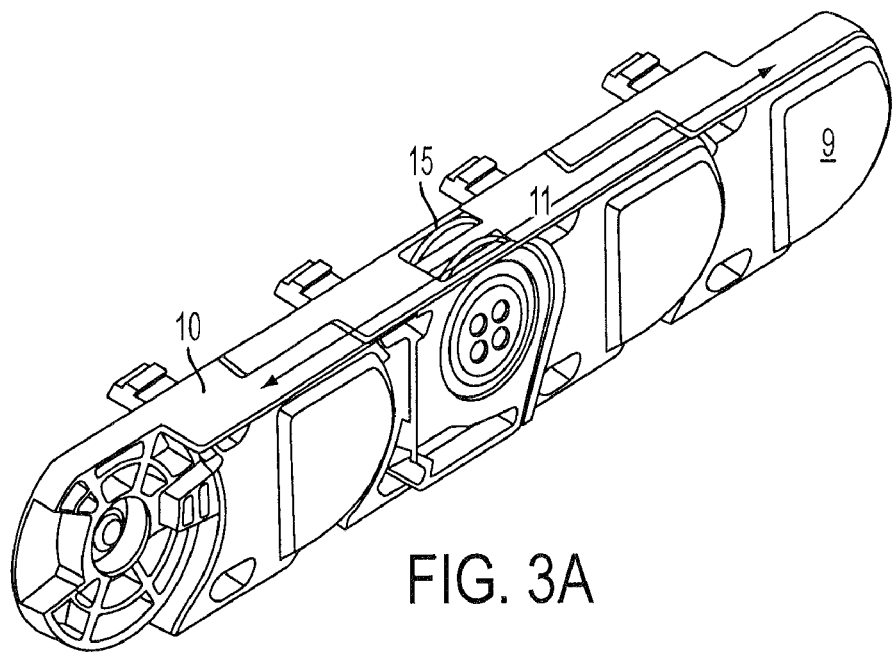
FIG. 3 shows a perspective view of the same strap strand, in the stretched configuration and the bent configuration.
Figure 3B:
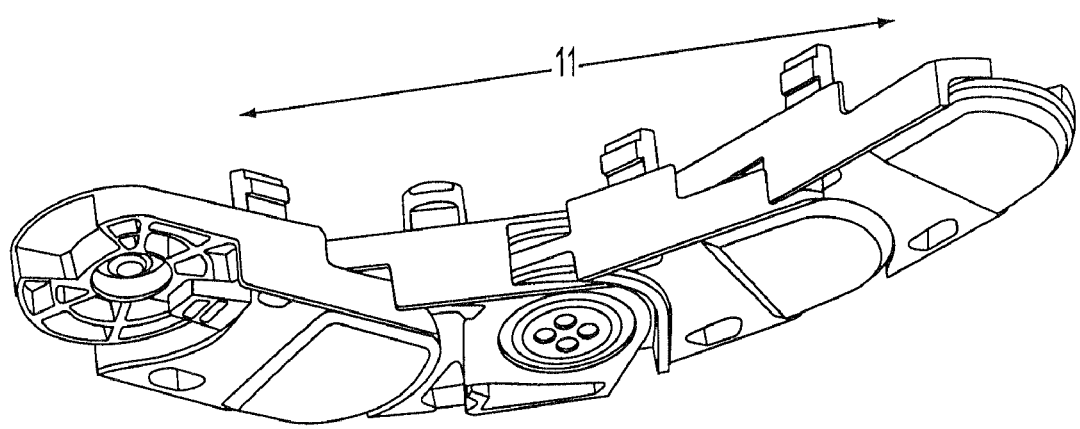
Figure 4:
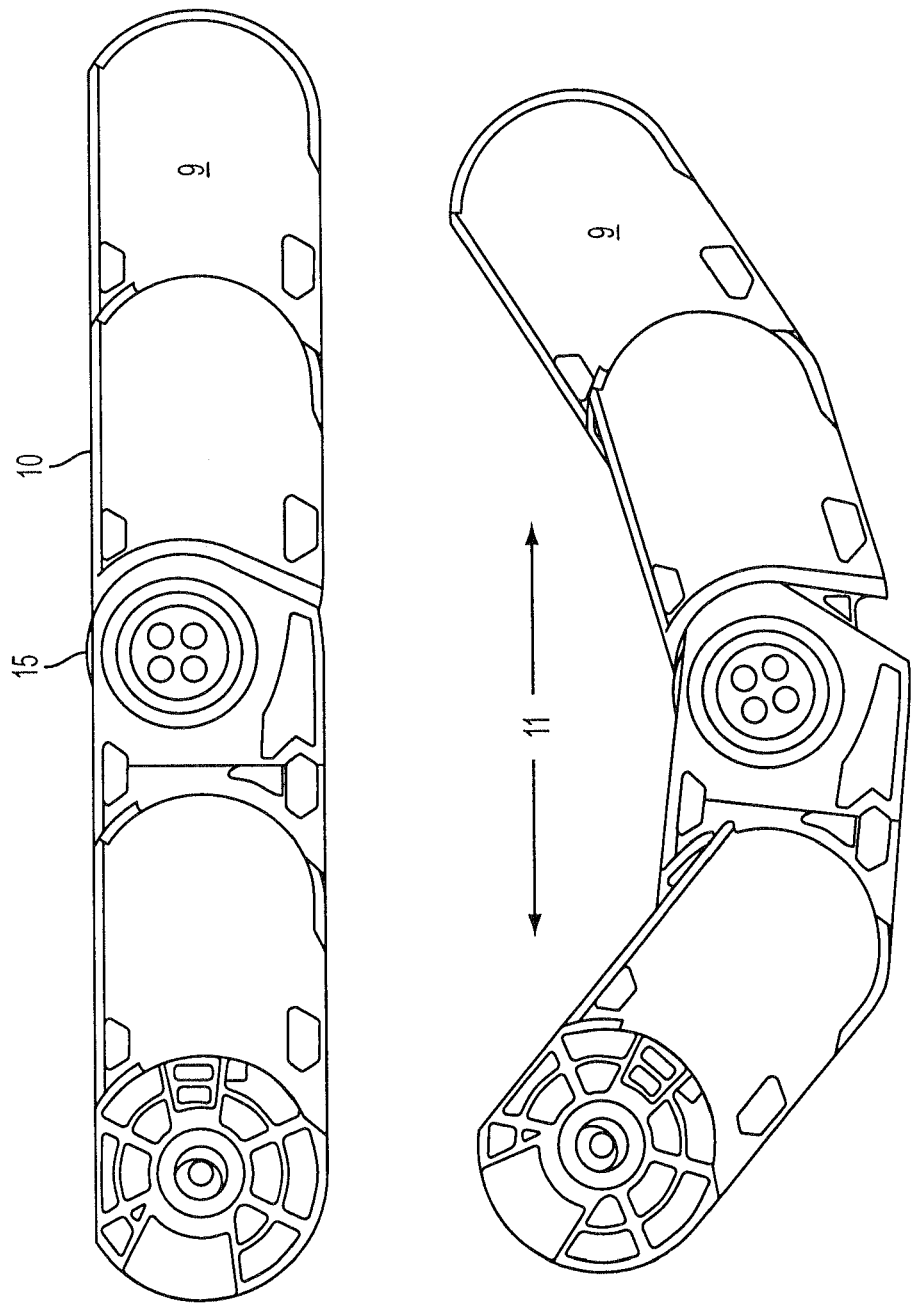
FIG. 4 shows a side view of the same strap strand, in the stretched configuration and in the bent configuration.

FIGS. 3 and 4 show a perspective view and a side view of the same strap strand section, in the stretched configuration a) and in the bent configuration b). Continuous running surface 11 can again be seen here, forming only small gaps even when bent.

LIST OF REFERENCE NUMBERS

1 Side strap
2 Pin receptacle
3 Pivot pin
4 Stop
5, 6 Narrow face
9 Side strap
10, 12 Narrow face
11 Running surface
13 Pin for cross-member
14 Gap
15 Roller
A Axis of symmetry
S Pivoting axis

The invention claimed is:

1. Energy guiding chian with a number of chain links connected to each other in articulated fashion, said chain links formed by mutually parallel side straps and cross-members connecting said side straps, said side straps each including a pair of narrow faces, where the energy guiding chain can be transversed in such a way that it forms a loop consisting of a lower strand, an oppositely facing upper strand, and a transitional area connecting said upper and lower strands, where one of the pair of narrow faces of the side straps faces towards the inside of the loop, and the other of the pair faces to the outside of the loop, and adjacent side straps can be pivoted relative to each other about a common pivoting axis defined by a pivot pin, characterized in that the distance between the pivoting axis and the narrow face of the side strap facing towards the inside of the loop is smaller than that between the pivoting axis and the narrow face of the side strap facing towards the outside of the loop and wherein the narrow faces of said side straps which face towards the inside of said loop form a continuous running surface.

2. Energy guiding chain according to claim 1, characterized in that at least some of the side straps which have narrow faces facing towards the inside of the loop are provided with rollers which can roll on the narrow face in the outside strand.

3. Energy guiding chain according to claim 2, characterized in that each roller includes an axis of rotation and said axis of rotation coincides with the pivoting axis of a pair of side straps.

* * * * *

UNITED STATES PATENT AND TRADEMARK OFFICE
CERTIFICATE OF CORRECTION

| | |
|---|---|
| PATENT NO. | : 7,444,800 B2 |
| APPLICATION NO. | : 11/738182 |
| DATED | : November 4, 2008 |
| INVENTOR(S) | : Hermey |

Page 1 of 1

It is certified that error appears in the above-identified patent and that said Letters Patent is hereby corrected as shown below:

Title Pg, Item (57), under "Abstract", last line, after "loop." insert -- (Fig. 2) --.

In column 2, line 62, in Claim 1, delete "chian" and insert -- chain --, therefor.

In column 2, line 67, in Claim 1, delete "transversed" and insert -- traversed --, therefor.

In column 4, line 6, in Claim 2, delete "outside" and insert -- opposite --, therefor.

Signed and Sealed this

Twenty-sixth Day of May, 2009

JOHN DOLL
*Acting Director of the United States Patent and Trademark Office*